June 1, 1943.  J. G. FORD  2,320,922
HIGH VOLTAGE COIL INSULATION
Filed Oct. 16, 1940
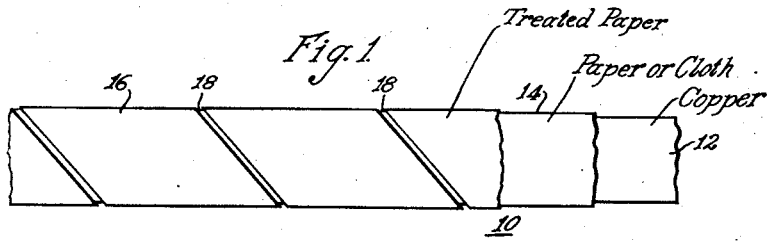
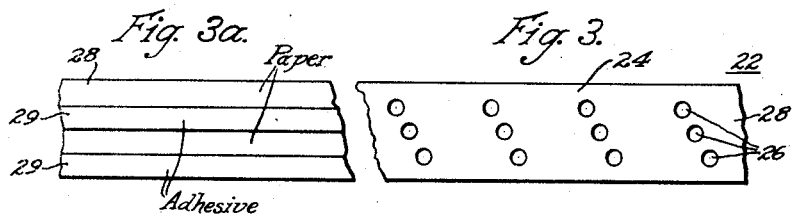
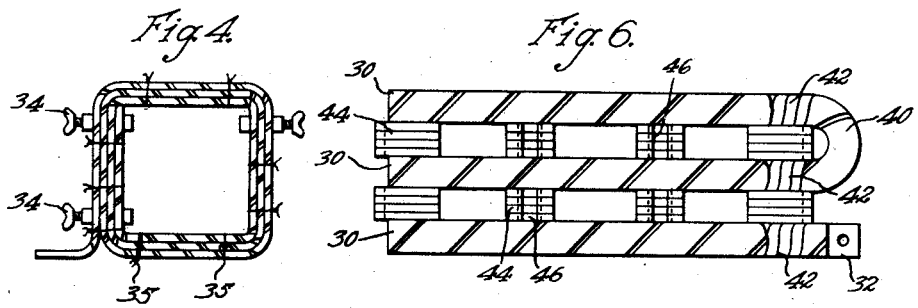
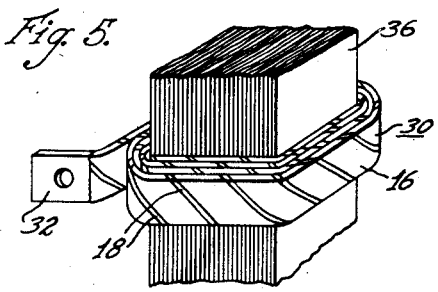
WITNESSES:
INVENTOR
James G. Ford.
BY
ATTORNEY Patented June 1, 1943

2,320,922

UNITED STATES PATENT OFFICE 2,320,922

HIGH-VOLTAGE COIL INSULATION

James G. Ford, Forest Hills, Pa., assignor to Westinghouse Electric & Manufacturing Company, East Pittsburgh, Pa., a corporation of Pennsylvania Application October 16, 1940, Serial No. 361,345

7 Claims. (Cl. 175—362)

This invention relates to high-voltage conductor insulation, particularly for conductors intended to be consolidated into unitary coils or other structures.

Heretofore, electrical conductors employed in various types of electrical machinery have been wound with paper, fabric and other insulation and the conductors fabricated into structures of predetermined shape and size. The completed fabricated structure was commonly varnished or treated with an insulating composition in order to cause impregnation of the paper or cloth insulation on the conductors in order to provide for good electrical insulation. One purpose of such treatment was to bond the conductors into a consolidated coil for mechanical strength. Another of the purposes of impregnation of such insulation on conductors was to fill voids and remove as much air as possible within the insulated layers on the conductor. Under high voltage stresses air will tend to ionize, particularly on surges, with consequent breakdown of the insulation. Furthermore, the impregnation treatment is intended to protect the conductor or fabricated structure against entry of moisture with consequent electrical deterioration of the insulation.

In electrical apparatus, where coils or shaped conductors were immersed within a fluid dielectric, the impregnation of the conductor with varnishes and other insulating compositions was accomplished for two additional purposes. Cellulosic insulation is particularly susceptible to chemical reaction with oxidized liquid dielectrics, such as oil. In addition, the bare copper conductor itself exerts a catalytic action in promoting the oxidation of oil. The use of the impregnating material separated the oxidized oil from the cellulose and also prevented the catalytic action of copper promoting oxidation of the oil.

Moisture may be present in exceedingly small amounts in liquid dielectric immersed apparatus, but is not a controlling factor in the breakdown of electrical insulation on conductors in apparatus of this type. Accordingly, impregnation with insulating compositions may be of value in moisture resistance, but moisture proofing is not critical.

Ordinarily liquid dielectric immersed conductor coils are not readily accesible for repairs without tearing down the entire apparatus. Therefore, any breakdown or electrical defect within the coils constitutes a serious repair problem and is to be avoided if at all possible.

It has been discovered that varnish or composition impregnated insulated conductors are peculiarly liable to surge breakdown. Such surges occur infrequently in service, but when they do occur, they cause considerable damage to the electrical apparatus. The high potential during surges stresses the insulation between turns of electrical coils. It has been found that varnish impregnated coils contain small pockets of air which have been entrapped by the viscous varnish during the impregnation process. The high surge potential causes ionization of this entrapped air and facilitates breakdown of the insulation. Therefore, in order to increase the surge strength of the insulation provided on the coils, it is fundamentally necessary to provide insulation that does not have air pockets.

Conductors covered with paper or fabric insulation could be immersed in the liquid dielectric without any varnish or impregnation treatment and the liquid dielectric would replace any air within the insulation and provide excellent surge insulation. However, in order to provide for consolidating coils which will retain their shape with good resistance to tearing apart and vibrating during operation, it is desirable to employ an adhesive bonding material between turns of coils. Such adhesive should be oil insoluble and consequently oil impermeable.

The object of this invention is to provide an oil-permeable insulating structure for adhesive consolidated electrical conductors.

A further object of the invention is to provide for improving the dielectric properties of adhesive coated insulation on conductors.

The invention, accordingly, comprises the several steps and the relation and order of one or more of such steps with respect to each of the others and the article possessing the features, properties and the relation of elements which are exemplified in the following detailed disclosure and the scope of the application of which will be indicated in the claims.

Figure 1 is a plan view of an insulated conductor;

Fig. 2 is an elevational view of a plurality of consolidated insulated conductors according to the invention;

Figs. 3 and 3a are plan views of a strip of coated insulating material;

Fig. 4 is a plan view of an insulated coil;

Fig. 5 is a perspective view of a fragmentary portion of a transformer; and

Fig. 6 is a plan view of several assembled coils.

According to the invention, conductors may be insulated and receive an application of oil impermeable and oil insoluble adhesive, which will permit the consolidation of a plurality of conductors into predetermined shape with provision for penetration of a liquid dielectric, such as oil, through the adhesive layer. Electrical conductors of this type are particularly desirable and useful in liquid dielectric immersed apparatus. The present conductor has all of the desirable characteristics of the conductors of the prior art and in addition provides better coil turn bonding and greater resistance to breakdown during high voltage surges due to the absence of air pockets within the insulation.

Referring to Fig. 1 of the drawing, an insulated conductor suitable for carrying out the invention is indicated generally by the numeral 10. The conductor member or wire 12 may be made of copper or any other suitable metallic conducting material.

It may desirable to coat the copper with a thin layer of oil insoluble varnish in order to assure that the copper will not function as a catalyst promoting the oxidation of the dielectric in which the conductor may be immersed. The conductor 12 is thereafter covered in any suitable manner with one or more layers of fluid dielectric permeable insulation 14, such as paper, cambric, cloth, glass fiber material and the like.

When the desired amount of dry insulation 14 has been applied to the conductor 12, the insulated conductor is spirally wrapped with an exterior layer of fluid dielectric impermeable adhesive treated cloth or paper 16 with open spaces 18 between successive spirals. The open spaces 18 in the exterior layer 16 are produced to permit air to escape and dielectric liquid to enter.

The treated paper or cloth 16 consists of a cloth or paper base material of any desired type, coated on one or both sides with an oil insoluble adhesive composition. In particular, the oil insoluble adhesive material is preferably thermoplastic.

Thermoplastic materials suitable for adhesive applications in liquid dielectrics are shellac, polyvinyl acetate, polyvinyl acetal and plasticized cellulose esters and ethers. Varnishes prepared from thermoplastic resins may be modified by adding sufficient thermosetting resin, such as the phenol-aldehyde type, to control the softening point within desired temperature limits. With such thermosetting resin additions a tape may be produced which is dry and non-tacky at room temperature but becomes adhesive at predetermined elevated temperatures. All of the listed thermoplastic resins are substantially insoluble in oil. Some are insoluble in the halogenated cyclic hydrocarbon dielectric fluids, e. g., dewaxed shellac and plasticized cellulose esters.

While thermoplastic resins are most readily adaptable to the purpose of this invention, other oil insoluble adhesives may be applied to the exterior layer 16. For example, polyvinyl alcohol produced by hydrolyzing polyvinyl esters 50% to 75% and dissolved in a 30% to 60% water-ethyl alcohol solvent may be applied to the paper or cloth tape. On drying the tape is coated with a hard dry film. The film is rendered adhesive by applying water or an aqueous aldehyde thereto. Pressure alone is sufficient to bond turns of moistened polyvinyl alcohol treated conductor. The usual heat and evacuation treatment given transformers will remove all the moisture from the coils. The polyvinyl alcohol adhesive is insoluble in both oil and halogenated hydrocarbon dielectric.

The cloth or paper may be coated on both sides by dipping into the thermoplastic resins dissolved in suitable solvents and the solvent removed by drying or applying heat. The coated paper or cloth will be substantially dry or non-tacky at this stage. The coated strips may be formed into rolls or stored in any other manner with suitable provision being made to prevent the layers from adhering to each other. This can be accomplished by proper curing of the coating in the treatment.

The fabrics, paper or other material, may be coated in any suitable manner with the thermoplastic adhesive on only one side of the paper. The coating may be effected by passing the cloth or paper over one roll while a second roll contacting the surface of the paper and dipping into a vat containing the dissolved adhesive conveys a thin layer of adhesive to the one surface of the cloth or paper. The final product will be as indicated above, that is, a substantially dry coated paper or cloth. Tacky adhesive coated material may be utilized satisfactorily soon after it is treated with good results, but is not easily stored.

If the strip 16, which is applied to the conductor 10, has adhesive material on one face only, the adhesive carrying face of the strip 16 is preferably turned outwardly in order that the consolidating function disclosed may be carried out. With dipped paper or cloth 16, having adhesive on both sides, this consideration does not apply. This latter type of arrangement of adhesive coating on both sides of the tape is preferred inasmuch as the inside adhesive coating on winding 16 will consolidate the inner insulating material 14 to the spiral winding 16 while the exterior portion of the coating will consolidate one turn to the other. Thus a much stronger consolidated structure will be effected with a strip coated on both sides.

The spaces 18 may be from $1/64$ to $1/16$ of an inch in width. The minimum space between adjacent spirals is determined by the tendency of the adhesive to flow together at the gap to form a continuous and impermeable film. The coated paper or cloth material 16 may be of any desired width. Satisfactory coils have been made with materials ranging in width from $1/4$ inch to 1 inch. The limitation on the width of the strip 16 is determined by the ability to handle the material on a wire covering machine.

The spaces 18 provide for the penetration or entry of liquid dielectric into the covered insulating portions 14. Under ordinary varnish impregnating treatment, the spaces 18 would have been more or less completely filled with varnish or other insulating composition and entry of liquid dielectric would be prevented. Limiting the oil-insoluble adhesive to a discontinuous outer layer, free entry of oil and ready escape for air and other gases present in the insulation 14 is provided. The thorough displacement of air from the insulation by the liquid dielectric will provide for a better overall electrical insulation of the conductor than will varnish impregnation treatment for the conductor.

A plurality of conductors 10, as shown in Fig. 1, may be consolidated into a superimposed unit as shown at 20 in Fig. 2. Under heat and pressure, the conductors will consolidate into a more or less rigid mass comprising several conductors. As shown in Fig. 2, the adhesive coated layers 16 on each conductor span the openings 18 of adjacent conductors and provide for a high percentage of adhesive contact. For the several thermoplastic adhesive materials, such as shellac, vinyl acetate and polyvinyl acetal, temperatures of 100 to 125° C. for a brief period of time will cause sufficient softening of the adhesive for cementation to occur. The assemblage is cooled before pressure is relieved. The cooled assembly 20 is ready for use.

The method of providing the type of discontinuous adhesive outer covering for insulated conductors shown in Figs. 1 and 2 is readily adapted to the coil or conductor wrapping machines known to the electrical industry today. However, other methods of providing for penetration of the liquid dielectric to the inner insulation are feasible. For example, as shown in Fig. 3, a coated strip 22 consisting of cloth or paper 24 is provided with a plurality of perforations 26. These perforations may be of any desirable shape, size or extent, depending on the application. One or more of the perforations per turn of strip 22 will be ordinarily exhibited at the edge of the conductor after it has been wrapped therewith. The strip 22 is coated with a solution of thermoplastic adhesive 28 as hereinbefore indicated, and dried. The strip may be applied to the coils in either overlapping or spaced apart spirals or other fashion, as desired.

A modified form of adhesive strip 16 which will permit oil penetration without spaces or perforations being required may be secured by applying a discontinuous coating of oil insoluble adhesive thereon. Spots or spaced bands of adhesive may be applied to a strip. As shown in Fig. 3a, two parallel bands of adhesive 29 are placed on a paper strip 28. Even when overlapped the uncoated portions of strip 28 will permit oil to penetrate therethrough to produce better conductor insulation.

Other methods of shaping the paper or cloth strips used for the outer layer on the conductors may be employed. The several tape modifications above indicated are merely exemplary of discontinuous exterior adhesive layers.

In some instances, instead of placing a coating of thermoplastic adhesive on the tape 16, it would be possible to employ films or strips composed entirely of cellulose acetate, polyvinyl alcohol and the like. The strips or films of resin would be wound in continuous spirals over the paper winding. Under heat and pressure the films will bond the whole and leave spaces for liquid dielectric penetration.

A conductor, as shown in Fig. 1, may be formed into a coil by winding the completely insulated conductor 10 about a mandrel or form of the required internal dimensions. After the required number of turns have been placed about the form and tied with string 35, the sides and corners of the completed coil may be clamped by means of clamps 34, as shown in Fig. 4. The external end of the coil is cleaned of insulation to provide for attaching to other electrical conductors. The clamped coil is then put into an oven and heated at a temperature of 100 to 125° C. for several hours to provide for thermoplastic consolidation. After cooling, the clamped conductor is a consolidated rigid structure which is usable for electrical manufacture.

In the case of circular coils, clamps are not required in effecting consolidation of the coil. It has been found that the tendency of the interior turns of circular coils to spring outward is enough greater than that of the less sharply bent outer turns that adequate pressure between turns exists to provide for good bonding when heated to 100° C. to 125° C.

In some cases the two exterior turns of large coils may be given a strengthening wrap of adhesive treated cloth. The cloth is preferably spiraled with large spaces between turns.

One particular application for the coil shown in Fig. 4 is in the construction of transformers. A fragmentary view of a portion of a transformer embodying the Fig. 4 coil is shown in Fig. 5. The transformer is composed of a magnetic core 36 composed of a plurality of laminations of magnetic material and is shaped to fit into the inner space of the coil. The coil 30, associated with other coils, is properly located on the magnetic core 36. Generally, Fullerboard spacing members are provided for properly locating a plurality of such coils with respect to each other and with respect to the magnetic core.

Referring to Fig. 6 of the drawing, a built up assembly of three coils 30 is shown. The last turn of the electrical conductor in each coil is taped thereto by means of coated fabric tape 42. The lead 40 of the conductor connects to the next coil. The tape 42 is preferably made of cloth impregnated with one of the thermoplastic adhesives hereinbefore mentioned.

The several pancake coils 30 are supported and separated by means of built up Fullerboard blocks consisting of a plurality of sheets coated with the thermoplastic adhesive. Keystone shaped slots 46 are provided on the ends of the Fullerboard blocks extending from out of the coils. These slots accommodate supporting members in the transformer casing.

The Fig. 6 assembly is heated from 100 to 125° C. while clamped, to cause the thermoplastic adhesive on the conductor, the tape and the Fullerboard to soften and unite the whole into a consolidated body. A much neater and more workmanship like job results as compared to the previous varnish impregnation and baking treatment.

It has been found that varnish impregnation and baking does not produce as good a bond as that secured by the present invention. When ordinary varnish impregnated coils are sawed apart, the turns separate easily from each other. Coils built of half-inch wide wire can be easily separated with the hands. In many cases the varnish has not even penetrated into the spaces between adjacent turns but simply bridges over the tops of the turns.

The thermoplastic resin coated tapes 16 effect a much better bonding between turns. It is quite difficult to separate two half-inch wide conductors a foot long treated in this way by means of the hands alone.

After asembly of the entire electrical members of the transformer, the unit is placed within a casing and the liquid dielectric, such as oil or halogenated cyclic hydrocarbon, is put in. The liquid dielectric will cover the coils 30 and by penetrating the spaces 18 will displace the air and saturate the uncoated insulation 14. An evacuating treatment prior to or during immersion in the dielectric may be employed in order to remove substantially all of the air and moisture in the electrical members. The application of the liquid dielectric will penetrate and saturate the inner insulation layer 14. The liquid dielectric will have no effect on the adhesive layer on strip 16 and the bond between turns of the coil will remain at its full strength.

Thus it may be seen that a construction is provided in which a coil has as good mechanical adhesion between turns as is available at the present state of the electrical art. However, the electrical insulation characteristics of the coil provided by this invention are greatly superior to those known in the electrical art. In particular, this coil will exhibit its superior insulation qualities on high-voltage or surge.

A further advantage with respect to the cost of preparing a coil is obtained by the construction shown in Fig. 4. In the present state of the electrical art in which impregnation by dipping in varnish is practiced, the coil is subjected to a prolonged and repeated baking and treatment which is not necessary in the present construction. In particular, repeated treatment of the coil according to this invention is obviated. The cleansing of the terminal leads 32 coated during impregnation, which necessitated a considerable amount of hand labor in the prior art construction, is practically eliminated inasmuch as varnish does not even contact the terminals 32.

Tests have been made in order to determine the thoroughness of the oil impregnation of the inner layers of insulation 14 within such coils as shown in the drawing. It was found that thorough oil impregnation was obtained within less than one-half hour when the coils were vacuum treated.

In comparing varnish impregnated and baked coils with the discontinuous outer layer bonded coils produced by this invention, it has been found that electrically the varnish treated coils as produced by prior art practice give inconsistent results. While the majority of the varnish treated coils give excellent results on surge testing, the minority of the varnish treated coils fail on testing. Occasionally several transformers with varnish impregnated coils will fail in succession in the surge test. The results show that the performance under high voltage surges is erratic and unpredictable.

The transformers built up from coils embodying the present invention are uniformly consistent. The failures are reduced to in insignificant amount. Each unit exhibits the same high values under surge test.

Since certain obvious changes may be made in the above procedure and different embodiments of the invention could be made without departing from the scope thereof, it is intended that all matter contained in the above description or taken in connection with the accompanying drawing, shall be interpreted as illustrative and not in a limiting sense.

I claim as my invention:

1. In an electrical coil for use in a liquid dielectric, in combination, a conductor, solid insulation carried by the conductor, the solid insulation being permeable by the liquid dielectric, a covering applied to the solid insulation and being substantially concentric with the conductor and solid insulation, and an adhesive applied to the covering presenting an exterior adhesive surface, the adhesive being insoluble in the liquid dielectric, the covering having openings leading to the solid insulation to provide the dielectric liquid access to the solid insulation, the turns of the coil made from the conductor being bonded directly to one another by the exterior adhesive surface provided on the covering, the adhesive on any turn of the coil serving to bond it to the next turn to provide a solidly bonded coil.

2. In an electrical coil for use in a liquid dielectric, in combination, a conductor, solid insulation carried by the conductor, the solid insulation being permeable by the liquid dielectric, a covering comprising a ribbon of fibrous material wound helically around the insulation, an adhesive applied to the helically wound covering and presenting an exterior adhesive surface, the adhesive being insoluble in the liquid dielectric thereby rendering the portions of the covering to which the adhesive is applied impervious to the liquid dielectric, the turns of the helically wound covering being spaced from one another to present an opening through which the liquid dielectric may gain access to the solid insulation, the turns of the coil made from the conductor being bonded to one another by the exterior adhesive surface, the adhesive on any turn of the coil serving to bond it to the next turn to provide a strongly bonded coil.

3. A single layer electrical coil for use in a liquid dielectric, comprising, in combination, an insulated electrical conductor disposed to simulate a spiral, the insulation on the electrical conductor being solid and permeable by the liquid dielectric, a fibrous covering wrapped helically around the conductor and solid insulation and substantially concentric with the conductor, the fibrous covering being permeable by the liquid dielectric and an adhesive applied to the fibrous covering presenting an exterior adhesive surface, the adhesive being insoluble in the liquid dielectric thereby rendering the portions of the fibrous covering to which it is applied impervious to the liquid dielectric, the turns of the helically wrapped fibrous covering being spaced to provide the liquid dielectric access to the solid insulation, the adhesive directly bonding the turns of the conductor to one another to provide a solidly bonded single layer coil.

4. In an electrical coil for use in a liquid dielectric, in combination, a conductor, solid insulation carried by the conductor, the solid insulation being permeable by the liquid dielectric, a covering applied to the solid insulation and substantially enveloping the conductor and solid insulation, the covering being permeable by the liquid dielectric, an adhesive applied to the covering presenting an exterior adhesive surface, the adhesive being insoluble in and impenetrable by the liquid dielectric, the exterior adhesive surface extending over only a portion of the covering to provide areas of the covering through which a liquid dielectric may penetrate to the solid insulation, the turns of the coil made from the conductor being so disposed that adjacent turns contact one another, the adhesive surfaces bonding the turns where they contact one another to provide a solidly bonded coil.

5. An insulated conductor for making an electrical coil for use in a liquid dielectric, comprising, in combination, a conductor, solid insulation enveloping the conductor, the solid insulation being permeable by the liquid dielectric, a covering applied to the solid insulation and being substantially concentric with the conductor and solid insulation, the covering being permeable by the liquid dielectric, and an adhesive applied to the covering presenting an exterior adhesive surface sufficiently extensive to provide for bonding directly together the turns of the conductor when made into the coil with adjacent turns contacting one another, the adhesive being insoluble in and impervious to the liquid dielectric and so applied as to expose part of the covering whereby the portions of the covering to which the adhesive are applied is impervious to the liquid dielectric and the portions of the covering to which no adhesive is applied affords the dielectric access to the solid insulation.

6. An insulated conductor for making an electrical coil for use in a liquid dielectric, comprising, in combination, a conductor, a solid insulation applied to the conductor, the solid insulation being permeable by the liquid dielectric, a covering applied to the solid insulation and being substantially concentric with the conductor and solid insulation, and an adhesive applied to the covering to present a sufficiently extensive exterior adhesive surface to provide for bonding adjacent turns of the conductor where they contact one another when made into a coil, the adhesive being insoluble in the liquid dielectric whereby the portions of the covering carrying adhesive are impervious to the liquid dielectric, the covering and the adhesive carried by the covering being so disposed on the solid insulation as to afford the liquid dielectric access to the solid insulation.

7. In a transformer having a winding submerged in a dielectric liquid, the winding comprising, a plurality of turns of an insulated conductor having a solid insulation thereon, the solid insulation on the conductor being permeable by the liquid dielectric, a covering substantially enveloping the conductor and being substantially concentric with it, the covering being permeable by the liquid dielectric, and an adhesive applied to the covering, the adhesive being insoluble in the liquid dielectric thereby rendering the portions of the covering carrying adhesive impervious to the liquid dielectric, the covering and adhesive carried by the covering being so disposed on the solid insulation as to afford the liquid dielectric access to the solid insulation, the adhesive on the covering being so disposed as to bond each turn directly to the next adjacent turn where they contact one another, thereby providing a solidly bonded winding.

JAMES G. FORD.